Figure 1:
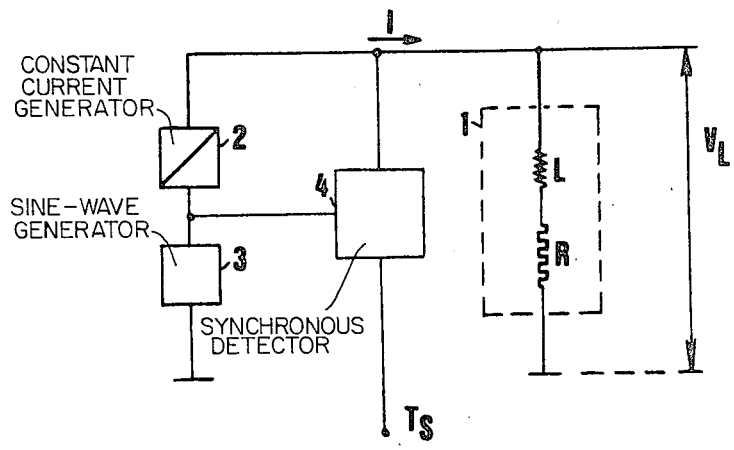

United States Patent [19]

Dardenne

[11] 4,074,185
[45] Feb. 14, 1978

[54] METHOD AND APPARATUS FOR MEASURING THE POSITION OF A MAGNETIC ROD

[75] Inventor: Regis Dardenne, Roselies, Belgium

[73] Assignee: ACEC, Ateliers de Constructions Electriques de Charleroi, Charleroi, Belgium

[21] Appl. No.: 710,106

[22] Filed: July 30, 1976

[30] Foreign Application Priority Data

July 31, 1975 Belgium .................................. 158795

[51] Int. Cl.$^2$ ............................................. G01R 33/00
[52] U.S. Cl. ..................................... 324/208; 324/59; 176/22
[58] Field of Search ................... 324/34 PS, 34 D, 37, 324/40, 59, 141, 62–64; 176/22, 23, 25

[56] References Cited

U.S. PATENT DOCUMENTS

| 3,030,574 | 4/1962 | Nissenson | 324/34 PS |
| 3,147,574 | 9/1964 | Pointe et al. | 324/34 PS |
| 3,852,661 | 12/1974 | Szabo | 324/34 PS |
| 3,857,089 | 12/1974 | Adler | 324/34 PS |

Primary Examiner—M. Tokar
Attorney, Agent, or Firm—Bacon & Thomas

[57] ABSTRACT

A method and an apparatus for measuring the position of a magnetic rod moving along the longitudinal axis of an induction coil. The induction coil is fed by means of a constant current AC supply and the resulting voltage appearing across the terminals of the induction coil is measured. Then, the reactive component value of that voltage is determined which is representative of the position occupied by the magnetic rod in the coil.

4 Claims, 3 Drawing Figures

METHOD AND APPARATUS FOR MEASURING THE POSITION OF A MAGNETIC ROD

The present invention relates to a method and an apparatus for measuring the position of a magnetic rod capable of movement along the longitudinal axis of an induction coil, particularly useful in determining the position of a regulating rod in nuclear reactors.

There are known systems wherein a regulating rod is integral with a channel control rod, of a magnetic material, and which is actuated by means of electromagnetically controlled catches. In such systems, the free end of the control rod is able of movements inside an induction coil, the latter being fed by a constant-current AC supply through a high impedance.

It is therefore possible to obtain an indication of the position of the rod by measuring the voltage appearing across the terminals of the induction coil, since the impedance of the coil is proportional to the penetration depth of the rod inside the induction coil. It is to be noted that a variation in the coil impedance means a variation in the resistive and reactive components of such impedance. But, upon the occurrence of a variation in the ambient temperature, and/or in the temperature of the magnetic rod, and/or the temperature of any conductive material interposed between the coil and the rod the position of which is to be measured, the resistive component of the impedance varies in substantially large amounts, whereas the reactive component is little affected.

Therefore, the known systems which are mostly based on the measure of the impedance of the coil are consequently very sensitive to such temperature variations.

Moreover, with nuclear reactors, the sensors used to measure the position of the regulating rods are located into a high and non-uniform temperature zone and consequently the resulting data obtained therewith are erroneous and unrealistic.

To remedy the above drawback, there has been proposed a sensor made up of a series of stacked induction coils, an electronic system then sequentially measuring the voltage appearing across the terminals of each and all coils. As in two nearby detecting coils, the control rod is moved into one of them, but not into the other, such system is indeed less sensitive to temperature variations. However, there still exists the inconvenience of having to install the electronic apparatus into a high temperature zone which is hardly accessible for maintenance.

The object of the present invention resides in a measuring method which is substantially free from temperature effects.

According to the present invention, the method of measuring the position of a magnetic rod able to move along the longitudinal axis of an induction coil which is fed by a constant-current AC supply is characterized in that the measured value which is representative of the position of the rod inside the coil is a measure of the reactive component of the voltage appearing across the terminals of such coil.

In accordance with a preferred embodiment of the present invention, the method is additionally characterized in that the in-phase vectorial product of the induction coil supply current and the voltage appearing across the coil terminals, that voltage being in quadrature with the current, is performed in order to obtain, as a result, the reactive component value of the voltage across the terminals of the induction coil.

The present invention also relates to an apparatus especially designed to carry on the measuring method described above.

Figure 2:
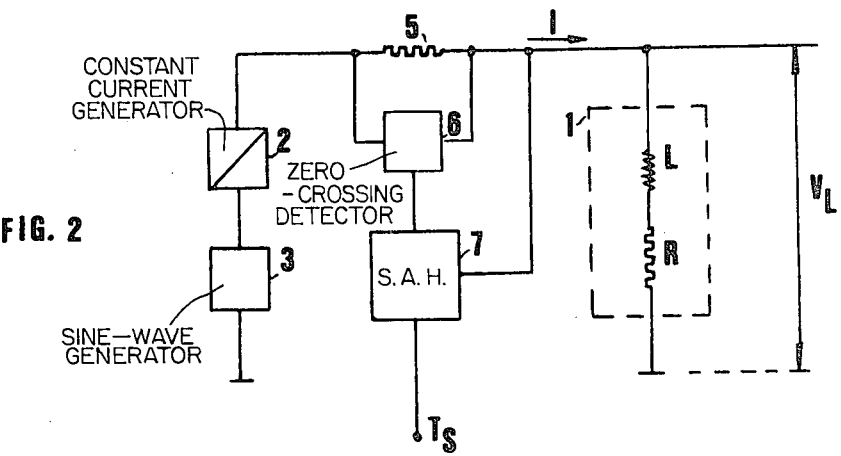
Figure 3:
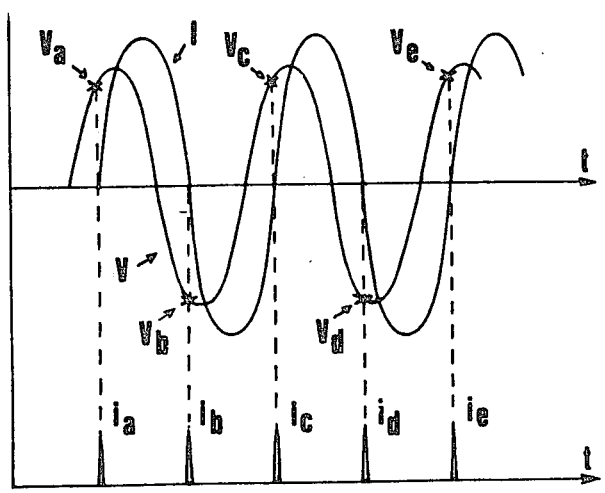

Preferred embodiments of the present invention will be hereinafter described with reference to the accompanying drawings, wherein FIG. 1 schematically illustrates an arrangement of the apparatus designed to carry on the method of the invention;

FIG. 2 schematically shows a further embodiment of the apparatus carrying on the method according to the invention; and FIG. 3 is a diagram illustrating the operation mode of the apparatus of FIG. 2.

Referring to FIG. 1, there is shown an equivalent electric circuit of the induction coil 1 the impedance of which comprises a resistive component R and a reactive component L. The induction coil is fed by a constant current generator 2 controlled by a sinusoidal wave generator 3. A synchronous detector 4 vectorially multiplies the in-phase input signals in order to obtain the reactive component of the voltage $V_L$, which is in quadrature with the current flowing through the coil, that reactive component of a non-zero value being delivered through the output $T_S$ of the detector 4.

Therefore, the novel method resides in measuring the reactive component of the induction coil impedance by eliminating the resistive component which is strongly submitted to temperature variations.

In accordance with a further embodiment, the moment at which the instantaneous value of the induction coil supply current crosses zero is detected, and, at that very moment, the voltage appearing across the terminals of the coil is measured so as to obtain the reactive component value of that voltage.

FIG. 2 illustrates an apparatus especially designed to carry on that measuring method, wherein the same reference numbers as in FIG. 1 are used to represent like elements. As shown, the supply current flows through a resistor 5 across the terminals of which is connected to zero-crossing detector 6.

As the measure of the voltage across the induction coil terminals is effected only at the moment where the AC supply current is substantially zero, it is necessary to register that measure for determining the actual position of the rod. The zero-crossing detector 6 therefore delivers sampling pulses to a "sample and hold" register 7.

As better seen from the diagram shown in FIG. 3, the current I is out-of-phase with the voltage V appearing across the terminals of the induction coil. When the instantaneous value of the current I is zero, the zero-crossing detector 6 forwards pulses $a_a$, $i_b$, $i_c$, $i_d$, $i_e$... to the register 7, thereby allowing the register to measure, at that very instant, the instantaneous values $V_a$, $V_b$, $V_c$, $V_d$, $V_e$... of the voltage across the induction coil terminals.

The register 7 then carries out a mean value of the instantaneous values $V_a$, $V_b$, $V_c$, $V_d$, $V_e$... to form the output voltage $T_S$ which is representative of the reactive component value of the voltage $V_L$ across the coil terminals, thereby providing an indication about the position of the magnetic rod.

It is understood that the above description is given by way of example only and does not limit the gist of the present invention, the scope of which is defined in the claims which follow.

I claim:

1. A method of measuring a position of a magnetic rod moving along a longitudinal axis of an induction coil, comprising the steps of:
   a. feeding the induction coil by means of a constant current AC supply,
   b. measuring a resulting voltage appearing across the terminals of the induction coil,
   c. measuring a reactive component of said voltage, said reactive component being representative of the position occupied by the magnetic rod in the coil,
   d. said reactive component measuring step comprising the step of vectorially multiplying, in phase, the coil supply current with the coil voltage, which is in quadrature with the current, so as to obtain the reactive component value of said voltage.

2. A method of measuring a position of a magnetic rod moving along a longitudinal axis of an induction coil, comprising the steps of:
   a. feeding the induction coil by means of a constant current AC supply,
   b. measuring a resulting voltage appearing across the terminals of the induction coil,
   c. measuring a reactive component of said voltage, said reactive component being representative of the position occupied by the magnetic rod in the coil,
   d. said reactive component measuring step further comprising the steps of:
      i. detecting the instant at which the instantaneous value of the coil supply current crosses zero, and
      ii. measuring, at said instant, the voltage across the coil terminals.

3. An apparatus for measuring the position of a magnetic rod moving along the longitudinal axis of an induction coil, comprising a constant current AC generator feeding said induction coil, to produce a voltage across the terminals of said coil, a synchronous detector fed with said voltage and by a sinusoidal wave generator controlling the AC generator for vectorially multiplying the signals at the inputs thereof, so that only the reactive component of said coil voltage is delivered at the output of said detector.

4. An apparatus for measuring the position of a magnetic rod moving along the longitudinal axis of an induction coil, comprising a constant current AC generator feeding said coil, means for detecting the zero-crossing of the instantaneous value of said current and delivering sample pulses, a register receiving said pulses for determining the corresponding instantaneous value of the voltage across the coil terminals and for carrying out a mean value of the instantaneous voltage values, said mean value being representative of the reactive component of the voltage across the coil terminals.

* * * * *